United States Patent
Shin (10) Patent No.: US 11,517,827 B2
(45) Date of Patent: Dec. 6, 2022

(54) DATA PROCESSING SYSTEMS AND METHODS FOR FACILITATING PLAYING ARCADE GAMES

(71) Applicant: iiRcade, Inc., Skokie, IL (US)

(72) Inventor: Jong-Wook Shin, Wilmette, IL (US)

(73) Assignee: iiRcade, Inc., Skokie, IL (US)

( * ) Notice: Subject to any disclaimer, the term of this patent is extended or adjusted under 35 U.S.C. 154(b) by 0 days.

(21) Appl. No.: 17/142,636

(22) Filed: Jan. 6, 2021

(65) Prior Publication Data

US 2021/0205716 A1 Jul. 8, 2021

Related U.S. Application Data

(60) Provisional application No. 62/957,791, filed on Jan. 6, 2020.

(51) Int. Cl.
*A63F 13/35* (2014.01)
*A63F 13/90* (2014.01)

(52) U.S. Cl.
CPC .............. *A63F 13/90* (2014.09); *A63F 13/35* (2014.09)

(58) Field of Classification Search
None
See application file for complete search history.

(56) References Cited

U.S. PATENT DOCUMENTS

| | | | |
|---|---|---|---|
| 6,108,195 A * | 8/2000 | Behl | G06F 1/16 248/917 |
| 8,612,228 B2 | 12/2013 | Hiraishi | |
| 9,619,962 B2 | 4/2017 | George et al. | |
| 9,623,327 B2 | 4/2017 | Miura et al. | |
| 10,255,765 B2 | 4/2019 | Washington et al. | |
| 2002/0119824 A1* | 8/2002 | Allen | A63F 13/35 463/42 |
| 2006/0068916 A1* | 3/2006 | Hiranoya | G07F 17/3239 463/42 |
| 2006/0080702 A1* | 4/2006 | Diez | A63F 13/335 725/30 |
| 2007/0155512 A1* | 7/2007 | Wells | G07F 17/32 463/46 |
| 2007/0227923 A1* | 10/2007 | Kidakarn | G06F 1/1681 206/320 |

(Continued)

FOREIGN PATENT DOCUMENTS

KR 10-02008-0077301 8/2008

OTHER PUBLICATIONS

International Search Report, dated Apr. 19, 2021, from corresponding International Application No. PCT/US2021/012277.

(Continued)

*Primary Examiner* — Damon J Pierce
(74) *Attorney, Agent, or Firm* — Brient IP Law, LLC (57) ABSTRACT

A gaming system provides one or more arcade gaming devices in wireless communication with a central server via a network. Each arcade gaming device is configurable as a cabinet arcade gaming device with an upper gaming unit coupled to a pedestal, or alternatively as a tabletop arcade gaming device for positioning on a tabletop or other surface without a pedestal. Games may be downloaded using the arcade gaming device or from a gaming application on a mobile computing device directly to the arcade gaming device via the central server.

25 Claims, 8 Drawing Sheets

(56) References Cited

U.S. PATENT DOCUMENTS

| | | | | |
|---|---|---|---|---|
| 2008/0070703 A1* | 3/2008 | Campo | ............... | G07F 17/3202 |
| | | | | 463/46 |
| 2008/0113789 A1* | 5/2008 | Canessa | .................. | G07F 17/32 |
| | | | | 463/29 |
| 2011/0018868 A1* | 1/2011 | Inoue | ................... | H04N 13/279 |
| | | | | 345/419 |
| 2014/0080557 A1* | 3/2014 | O | ........................... | A63F 13/814 |
| | | | | 463/7 |
| 2017/0372524 A1* | 12/2017 | Hill | ....................... | G06T 19/006 |

OTHER PUBLICATIONS

Written Opinion of the International Searching Authority, dated Apr. 19, 2021, from corresponding International Application No. PCT/US2021/012277.

\* cited by examiner

DATA PROCESSING SYSTEMS AND METHODS FOR FACILITATING PLAYING ARCADE GAMES

CROSS-REFERENCE TO RELATED APPLICATION

This application claims priority to U.S. Provisional Patent Application Ser. No. 62/957,791, filed Jan. 6, 2020, entitled, "DATA PROCESSING SYSTEMS AND METHODS FOR FACILITATING PLAYING ARCADE GAMES", and the disclosure of which is hereby incorporated by reference in its entirety.

BACKGROUND

In the 1980's and 1990's, arcade-style video games were extremely popular. The majority of these games were played in arcades or other public venues on computing devices that were installed in upright cabinets that included a display screen and a set of controls (e.g., joysticks, buttons, trackball controllers, steering wheels, light guns, etc. . . . ). The controls were configured to allow users to control play on the display screen. Examples of classic versions of such arcade games include Space Invaders, Asteroids, Pac Man, Defender, Q-Bert, Street Fighter, and Mortal Comba—among many others. The games were run by a computer processor running software that was typically included on a dedicated board for the video game.

With the advent of console-style video games, which, once purchased, can be played for no cost at home, most traditional arcades went out of business. This lead many—especially those who grew up in the 80's and 90's—to purchase classic cabinet-style arcade gaming systems of their own. One significant problem with this approach is that, if the individual wanted to play different arcade games, they would either have to purchase a separate dedicated machine for each game, or purchase a different board for each game that they wanted to play and then install and configure a different board every time they wished to play a different game.

To overcome this, some built or purchased "multicade" cabinets that typically included a cabinet, a PC, a computer display, and suitable controls. The PC was loaded with "ROMs", which each emulated a classic arcade gaming system.

There are many disadvantages associated with such multicade-style arcade games. First, many of the games are loaded with unlicensed, illegal versions of the games. Second, the games may run faster or slower than the original games due to differences between the speed of modern processors and those of the original games. Third, using such multicade machines may require the user to manually configure the machine for each game played.

Accordingly, there is a present need for improved arcade systems that address the above problems.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the disclosure, a gaming system includes an arcade gaming device having an upper gaming unit that is sized and configured for selective coupling to a pedestal. The upper gaming unit includes a housing that defines a front opening that is configured at a non-zero angle relative to horizontal. One or more computer processors are disposed within the housing, along with memory that is communicatively coupled to the one or more computer processors. A computer program product is stored within the memory and has computer-readable instructions corresponding to a plurality of arcade games. A display is positioned adjacent to the front opening. A control panel includes at least one joystick and a number of buttons and/or one or more other gaming controllers. The one or more computer processors, the computer program product, the display, and the control panel are operatively coupled to allow a user to play each of the plurality of arcade games According to another aspect, a gaming system includes a pedestal and an upper gaming unit configured for removable attachment to the pedestal. The upper gaming unit includes a housing, a display, a control panel, and a gaming computer. The housing defines a front opening configured at a non-zero angle relative to horizontal. The display is positioned adjacent to the front opening. The control panel includes at least one joystick and a number of buttons. The gaming computer includes one or more computer processors and memory communicatively coupled to the one or more computer processors. The gaming computer is adapted to receive an encrypted digital package comprising at least one game file corresponding to a selected game, decrypt the encrypted digital package, install the at least one game file, configure the control panel according to the at least one game file, and provide gameplay of the selected game.

According to yet another aspect of the disclosure, a gaming system includes a central server, a gaming application adapted for execution on a mobile computing device and to provide a user interface comprising a menu of games available for download, and at least one arcade gaming device adapted for wireless communication with the central server via a network. The at least one arcade gaming device includes a pedestal and an upper gaming unit configured for removable attachment to the pedestal. The upper gaming unit includes a housing defining a front opening configured at a non-zero angle relative to horizontal, a display positioned adjacent to the front opening, a control panel comprising at least one joystick and a plurality of buttons, and a gaming computer having one or more computer processors and memory communicatively coupled to the one or more computer processors. The central server is adapted to receive a request for a game from the gaming application or from the gaming computer, in response to receiving the request, creating a digital package comprising at least one game file corresponding to the game, encrypt the digital package to create an encrypted digital package, and transmit the encrypted digital package to the gaming computer of the upper gaming unit. The gaming computer is adapted to receive the encrypted digital package comprising the at least one game file corresponding to the game, decrypt the encrypted digital package, install the at least one game file, configure the control panel according to the at least one game file, and provide gameplay of the selected game.

BRIEF DESCRIPTION OF THE DRAWINGS

Various embodiments of the invention will be described below. In the course of the description, reference will be made to the accompanying drawings, which are not necessarily drawn to scale, and wherein.

DETAILED DESCRIPTION OF VARIOUS EMBODIMENTS

Various embodiments will now be described more fully hereinafter with reference to the accompanying drawings and Appendix A. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Arcade systems, according to various embodiments, include: (1) a unique cabinet structure that includes a gaming unit that may be selectively installed on a pedestal for game play, or that may be used on other support surfaces, such as a bar top; (2) game selection functionality that allows users to purchase games, for example, using a mobile computing device such as a smartphone, tablet computer, or laptop computer—the system then automatically installs the purchased game on the user's arcade gaming device; (3) encryption technology that is configured to assure that purchased games are only playable on gaming devices associated with the individual who purchased the games; (4) online play capabilities that allow a user to play classic arcade games and other games with individuals who are remote to the user (e.g., in another city or state); (5) local play capabilities that allows for multiple users to play a game together on multiple gaming devices that are in a particular location; (6) a modular, configurable cabinet that allows users to easily exchange components, such as the control panel or pedestal, with a replacement control panel or pedestal that includes different components; (7) an operating system with embedded video game system emulators that is configured to automatically select the appropriate video game emulator for a particular game to be played; (8) one or more analog joysticks (or one or more other controllers, such as one or more track balls, light guns or steering wheels) that sense the degree of joystick displacement (or other controller displacement) and that optionally include haptic functionality; (9) the ability to allow a single user to use both a first user controller (e.g., joystick, roller ball, light gun, etc.) and a second user controller (e.g., at the same time) as controls for a single player; (10) the ability to allow a large number of users to play sports games and other games together, where each player is playing the game using a dedicated arcade system; and (11) the ability to allow users to configure physical skins on the outside of the arcade system's cabinet. Each of these aspects is discussed in greater detail below after a brief discussion of Exemplary Technical Platforms that may be used to implement various embodiments.

Exemplary Technical Platforms

As will be appreciated by one skilled in the relevant field, the present systems may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 1:
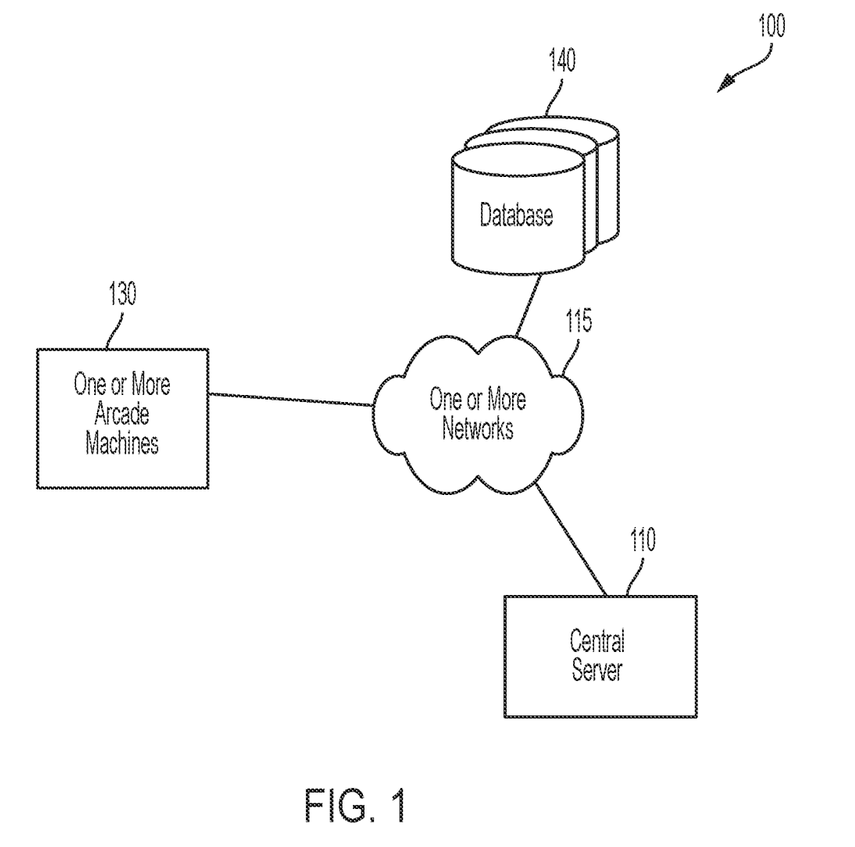
FIG. 1 depicts an online gaming platform according to particular embodiments.

FIG. 1 is a block diagram of an online gaming platform 100 according to a particular embodiment. As may be understood from this figure, the online gaming platform 100 includes a central server 110, one or more networks 115, one or more arcade gaming devices 130, and one or more databases 140. In particular embodiments, the one or more networks 115 facilitate communication between the one or more arcade gaming devices 130, the central server 110 and the one or more databases 140. As will be described in greater detail below, the one or more arcade gaming devices 130 may be configured as tabletop arcade gaming devices that sit on a bar top or tabletop that may be played while a user sits on a chair or stands in front of the device, or may alternatively or additionally be coupled to a pedestal to create a cabinet arcade gaming device that may be played while a user is standing. In other embodiments, an arcade gaming device 130 may be a traditional, one-piece arcade gaming cabinet.

The one or more networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computing devices). The communication link between the one or more arcade gaming devices 130 and the central server 110 may be, for example, implemented via a Local Area Network (LAN) or via the Internet.

Figure 2:
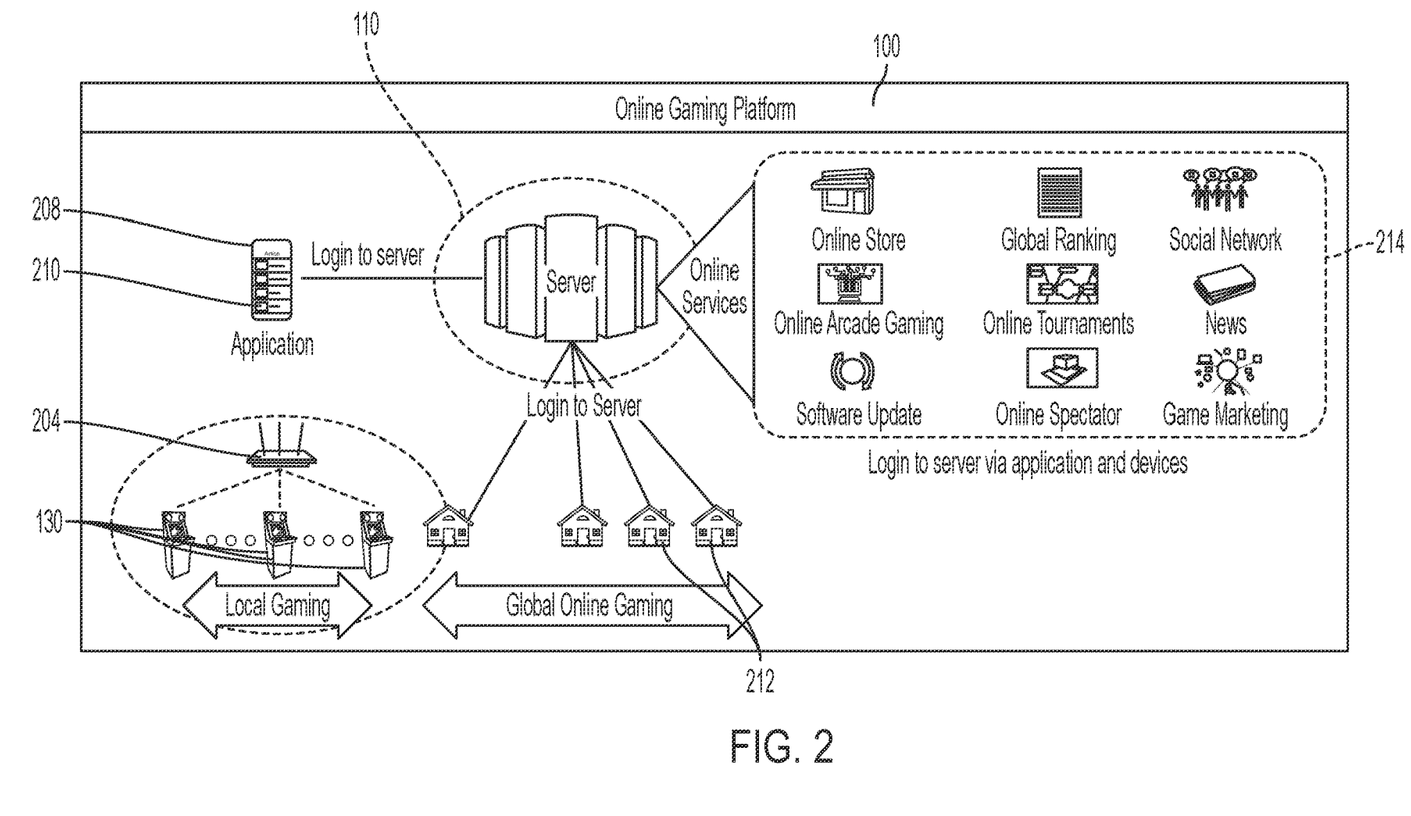
FIG. 2 further depicts an online gaming platform according to a particular embodiment.

FIG. 2 depicts a particular embodiment of an online gaming platform 100 according to particular embodiments. In this embodiment, the gaming system includes a central server 110 that is communicatively connected, via a suitable network 115, such as the Internet, to one or more mobile devices 208 executing a gaming application 210, and to one or more arcade gaming devices 130 within each of a plurality of homes 212 or businesses. As shown in this figure, a router 204 within any particular home 212 or business may be used to connect multiple arcade gaming devices 130 within the home or business to facilitate having multiple players each use a respective one of the arcade gaming devices 130 to play a game together (e.g., three players may each use a respective arcade gaming device 130 to simultaneously play a three-player arcade game together). Additionally, one or more arcade gaming devices 130 in multiple homes 212 or businesses may be used to play multiplayer games over the network 115 via the central server 110 and any applicable routers 204.

As may be understood from this figure, the central server 110 may facilitate the provision of various online services 214, such as: (1) an online store from which a user may purchase games or other software applications to install on one or more arcade gaming devices associated with the user; (2) a global ranking display that shows the respective global rankings of multiple players of a particular game (e.g., all players of a particular arcade game ranked in order of their highest score achieved playing a particular arcade game); (3) social networking functionality; (4) online arcade gaming; (5) online arcade gaming tournaments; (6) news; (7) software updates for the arcade gaming devices; (8) online spectator functionality that allows particular users to view the gameplay of other users on the particular users' respective arcade gaming devices; and (9) game marketing services.

Figure 3:
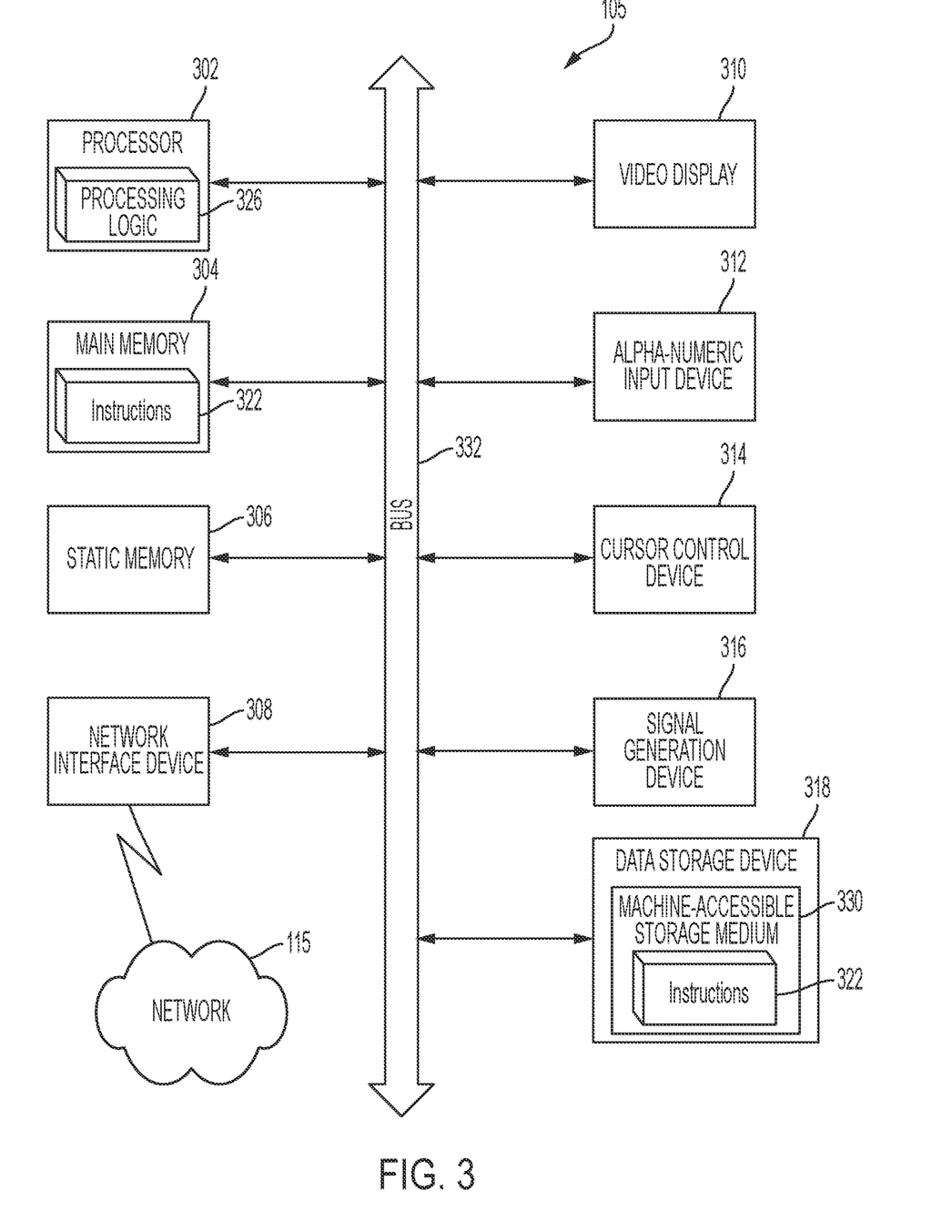
FIG. 3 is a schematic diagram of a computer (such as the central server, or one or more arcade gaming devices that are suitable for use in various embodiments of the online gaming platform shown in FIG. 1).

Turning now to FIG. 3, a diagrammatic representation of an example computer architecture associated with a computer device 105 computer device that can be used within the online gaming platform 100, for example, as a client computer (e.g., within one of the one or more arcade gaming devices 130 shown in FIG. 1), or as a server computer (e.g., within the central server 110 shown in FIG. 1). According to the various embodiments described below, the components described with respect to the arcade computer architecture of the computer device 105 may be utilized within any configuration of the arcade gaming devices 130 described herein.

In particular embodiments, the computer device 105 may be connected (e.g., networked) to other computing devices via a LAN, an intranet, an extranet, and/or the Internet. As noted above, the computer device 105 may operate in the capacity of a server and/or a client computing device in a client-server network environment, and/or as a peer computing device in a peer-to-peer (or distributed) network environment. computer device 105 may be a desktop personal computing device (PC), a tablet PC, a set-top box (STB), a Personal Digital Assistant (PDA), a cellular telephone, a web appliance, a gaming system, a server, a network router, a switch or bridge, or any other computing device capable of executing a set of instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein.

Returning to FIG. 3, an exemplary computer device 105 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 318, which communicate with each other via a bus 332.

The processing device 302 represents one or more general-purpose or specific processing devices such as a microprocessor, a central processing unit, or the like. More particularly, the processing device 302 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 302 may also be one or more special purpose processing devices such as an application specific integrated circuit (ASIC), a field programmable gate array (FPGA), a digital signal processor (DSP), network processor, or the like. The processing device 302 may be configured to execute processing logic 226 for performing various operations and steps discussed herein.

The computer device 105 may further include a network interface device 308. The computer device 105 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The data storage device 318 may include a non-transitory computing device-accessible storage medium 330 (also known as a non-transitory computing device-readable storage medium or a non-transitory computer-readable medium) on which is stored one or more sets of instructions (e.g., software 322) embodying any one or more of the methodologies or functions described herein. The software 322 may also reside, completely or at least partially, within the main memory 304 and/or within the processing device 302 during execution thereof by the computer device 105—the main memory 304 and the processing device 302 also constituting computing device-accessible storage media. The software 322 may further be transmitted or received over a network 115 via a network interface device 308.

While the computing device-accessible storage medium 330 is shown in an exemplary embodiment to be a single medium, the terms "computing device-accessible storage medium" and "computer-readable medium" should be understood to include a single medium or multiple media (e.g., a centralized or distributed database, and/or associated caches and servers) that store the one or more sets of instructions. The terms "computing device-accessible storage medium" and "computer-readable medium" should also be understood to include any device that is capable of storing, encoding or carrying a set of instructions for execution by the computing device and that cause the computing device to perform any one or more of the methodologies of the present invention. The terms "computing device-accessible storage medium" and "computer readable medium" should accordingly be understood to include, but not be limited to, solid-state memories, optical and magnetic media, etc.

Structure and Operation of Example System

The structure and operation of various example embodiments are described in greater detail below. It should be understood that variations of the described embodiments are to be included in the scope of the application's claims.

Structure of an Arcade Gaming Device

As mentioned above, according to various embodiments described herein, an arcade gaming device 130 may be configured as a cabinet arcade gaming device that may be played while a user is standing, or as a tabletop arcade gaming device that sits on a bar top or tabletop while a user sits on a chair or stands in front of the device to play. Specifically, as shown in the exploded view of FIG. 4, the upper gaming unit 402 is configured to be selectively detached from the pedestal 404 so that the upper gaming unit 402 may be played: (1) while the upper gaming unit 402 is being supported by the pedestal 404; or (2) while the upper gaming unit 402 is being supported by a support structure other than the pedestal, such as a bar top or tabletop. When the upper gaming unit 402 is selectively attached to the pedestal 404, the arcade gaming device 130 will be referred to as a cabinet arcade gaming device 420, as shown in FIG. 5. When the upper gaming unit 402 is selectively detached from the pedestal 404, the arcade gaming device 130 will be referred to as a tabletop arcade gaming device 422, as shown in FIG. 6. In this manner, the arcade gaming device 130 is selectively reconfigurable between tabletop and cabinet configurations, providing a flexible solution to space availability and corresponding constraints within the environment in which the gaming system will be utilized. Any type and quantity of fasteners or coupling mechanisms may be used for removably coupling the upper gaming unit 402 to the pedestal 404. In alternative embodiments, the arcade gaming device 130 may be a traditional, one-piece, standup cabinet arcade gaming system.

Aspects of an arcade gaming device 130 according to various embodiments will now be described with respect to FIGS. 4-6. In this embodiment, the arcade gaming device 130 may serve as both a cabinet arcade gaming device and a tabletop arcade gaming device. As shown, the cabinet arcade gaming device 420 includes; (1) an upper gaming unit 402 that includes a housing 406 defining a front opening 407; (2) a display 408 positioned adjacent the front opening 407 so that the display 408 may be viewed through the front opening 407; (3) a control panel 410 (including one or more controls such as joysticks 412, buttons 414, trackball controls, etc.) positioned adjacent and below the display 408; (4) one or more speakers 416 positioned adjacent and above the display 408; and (5) a pedestal 404 positioned below the upper gaming unit 402 so that the pedestal 404 supports the weight of the upper gaming unit 402.

Because the arcade gaming device 130 is configured to be positioned generally in front of a user that may be standing or sitting while playing corresponding arcade games, the display screen is configured according to a non-zero angle relative to the horizontal. In various embodiments, the display 408 is positioned at an angle of between about 50 degrees and about 70 degrees relative to the horizontal (e.g., between about 57 degrees and about 63 degrees—e.g., about 60 degrees). It should be appreciated that although any non-zero angle may be utilized, an angle of between about 50 degrees and about 70 degrees relative to the horizontal allows for an optimal viewing angle while also positioning the speakers 416 above and rearward from the display 408 and control panel 410, at a position that directs sound at and partially around the user facing the display 408.

Configurable Cabinets and Installation Kits

In various embodiments, the cabinet of an arcade gaming device 130 may be adapted to be re-configured using basic tools by a lay person who has no experience building or repairing arcade gaming devices. In particular embodiments, for example, the system may be configured to allow users to easily remove one or more preassembled cabinet-electronics assemblies and replace the one or more preassemblies with one or more different pre-assembled cabinet-electronics assemblies. For example, the cabinet may be configured to allow a user to swap a particular control panel (e.g., one that includes joysticks and control buttons) with a different control panel (e.g., one that includes a steering wheel controller). In other embodiments, at least a portion of the pedestal may be swapped out for a preassembled cabinet-electronics assembly, such as a front panel that includes a coin door and/or a pedal to control a user's acceleration and/or braking in the context of a driving game.

Figure 4:
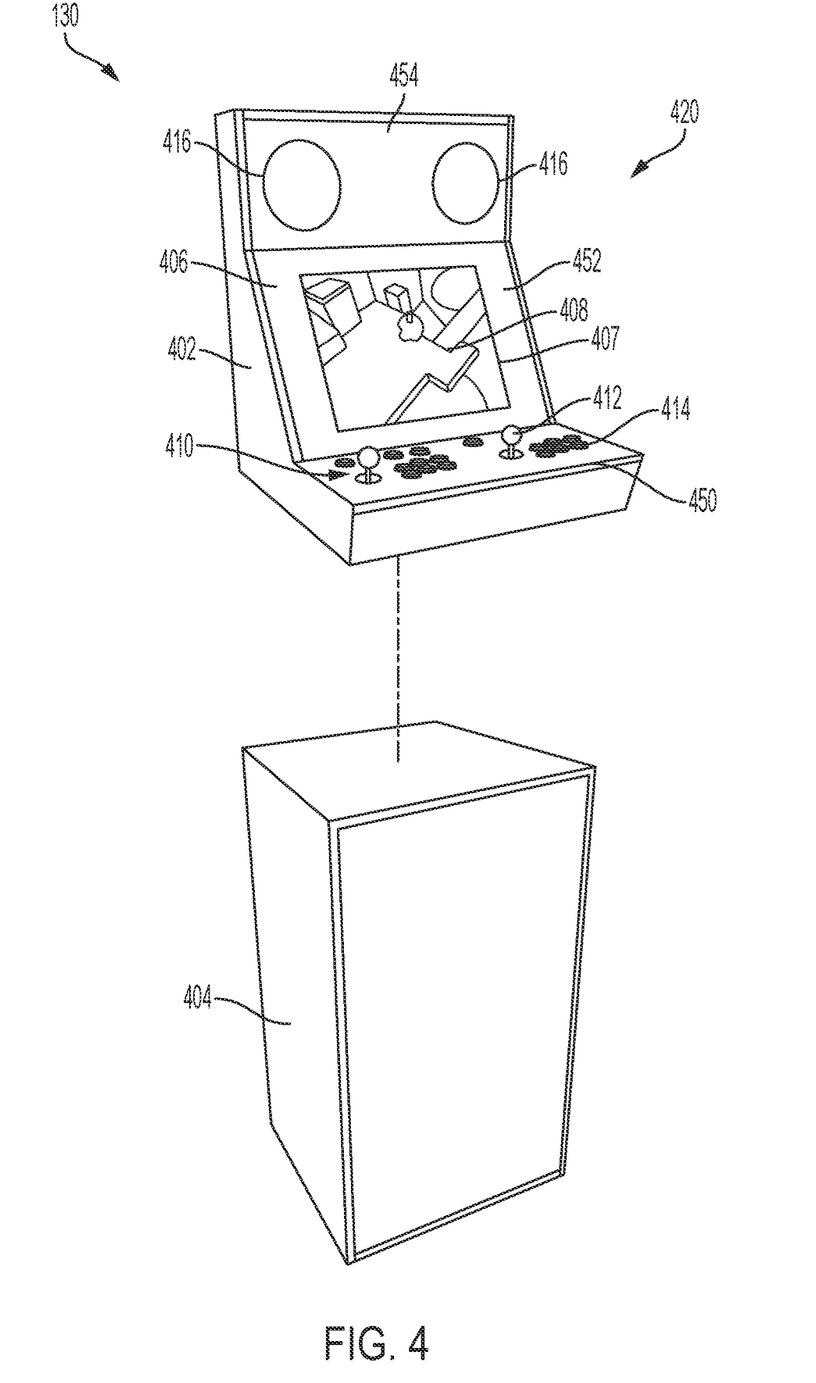
FIG. 4 depicts an exploded view of a cabinet arcade gaming device, showing the separate tabletop and pedestal units according to various embodiments.
Figure 5:
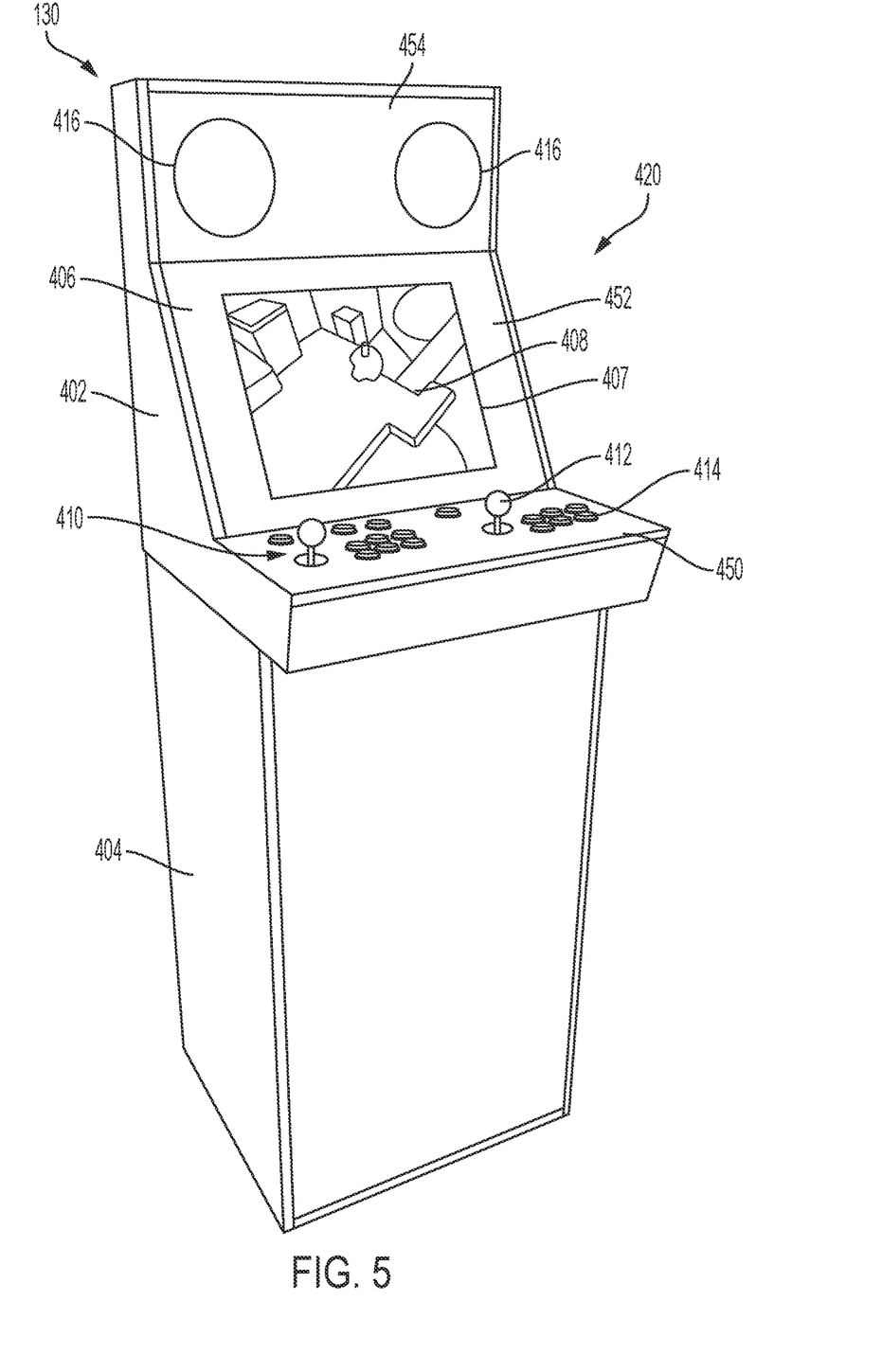
FIG. 5 depicts a cabinet arcade gaming device according to various embodiments.
Figure 6:
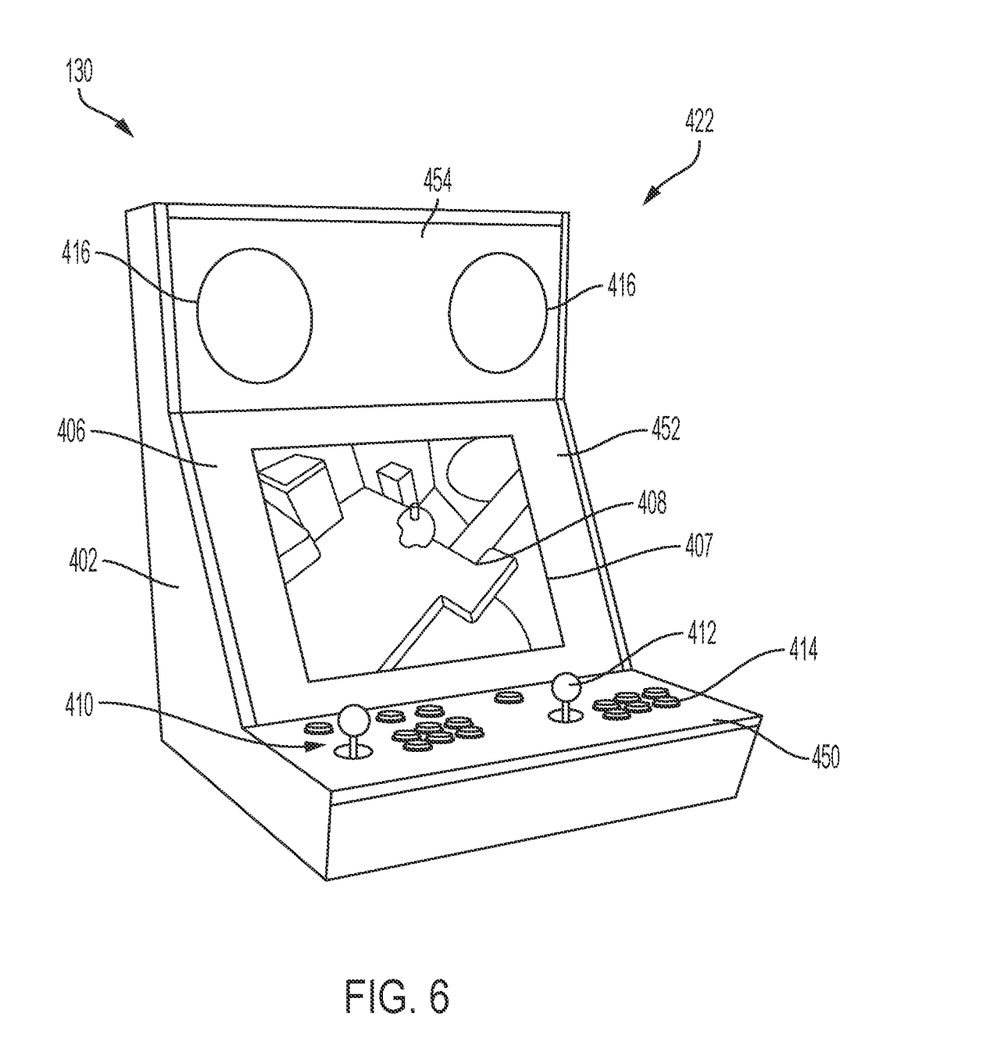
FIG. 6 depicts a tabletop arcade gaming device according to various embodiments.

In various embodiments, the arcade gaming device 130 shown in FIGS. 4-6 includes a plurality of cabinet pieces that includes one or more pre-assembled cabinet-electronics assemblies. These preassembled cabinet-electronics assemblies allow for quick and easy replacement of defective components, and/or customization of the arcade gaming device 130 according to the user's preference or budget considerations. For example, the preassembled cabinet-electronics assemblies may include a preassembled control board 450 with the control panel 410 that includes one or more video game controls (e.g., joysticks 412, control buttons 414, trackballs, etc.) that have been preinstalled on a support portion and wired so that the controls may be operably connected to the cabinet arcade gaming device's internal computing components (e.g., via a single electronic connector).

The preassembled cabinet-electronics assemblies may further include a preassembled display panel 452 that includes a monitor or display 408 that has been preinstalled on a support portion of the housing 406 surrounding the display 408 and defines the front opening 407 so that a display portion of the monitor may be seen through the front opening 407 in the support portion as shown in FIGS. 4-6, and wired so that the display 408 may be operably connected to the arcade gaming device's internal computing components (e.g., via a single electronic connector).

The preassembled cabinet-electronics assemblies may additionally include a speaker panel 454 that includes at least one speaker (e.g., two speakers) that has been preinstalled on a support portion so that an output portion of each speaker extends into an opening within the support portion and wired so that the monitor may be operably connected to the cabinet arcade gaming device's internal computing components (e.g., via a single electronic connector). The preassembled cabinet-electronics assemblies may further include a computer support portion (not shown) that includes at least one processor and memory that are installed on a support portion.

The plurality of cabinet pieces may further include, for example, at least two side panels, a back panel, front and rear pedestal panels, two side pedestal panels, top and bottom pedestal panels, and any other panels needed to cooperate with the preassembled cabinet-electronics assemblies to form the cabinet. In particular embodiments, a plurality of cabinet pieces are sold as a kit along with instructions on how to complete the assembly and the hardware (e.g., screws or other hardware) needed to complete the assembly and operatively connect the various electronic and computing components together so that the resulting cabinet arcade gaming device is operable to facilitate playing video games on the machine. In particular embodiments, the plurality of cabinet pieces and hardware are configured to allow a user to selectively disassemble and reassemble the cabinet as needed by completing a limited number of steps (e.g., less than 20 steps).

The kits may allow for customization of the arcade gaming device 130 by providing various options for applicable cabinet pieces. For example, different control boards 450 may be offered with various control panels 410 having different numbers, types, or configurations of the one or more video game controls. Similarly, different speaker panels 454 may allow for selection of different quantities, qualities, or positioning of the speakers 416.

Game Selection and Purchase Functionality

As discussed above, the arcade gaming device 130 includes one or more computer processors and computer memory disposed within the housing 406 of the arcade gaming device 130. The computer memory may include gaming computer software that, when executed by the one or more processors, displays one or more animated images on the display, and that allows a user to play a game by manipulating the one or more animated images on the display using the one or more controls. For example, as will be understood by one skilled in the relevant field, when the arcade gaming device's processors are running the game PacMan, a user may play the game by using the arcade gaming device's controls to move a "PacMan" icon along a path to collect dots and to avoid ghost icons.

In various embodiments, the connected arcade platform is configured to allow users to purchase games via an electronic store. In particular embodiments, a user may do this via a suitable gaming application 210 running on a portable computing device, such as a mobile phone or other mobile device 208, associated with the user. In a particular embodiment, the gaming application, which may run on a computer server that is remote from the user's mobile device, 210 will display a list of games that are available to purchase and, in response to the user selecting and facilitating payment for the game, the system may automatically download the purchased game to one or more arcade gaming devices 130 associated with the user. This may be facilitated, for example, by the fact that the arcade gaming device 130 is connected to a particular network (e.g., the Internet) so that it is enabled to communicate with the remote server. The download may be executed, for example, when the arcade gaming device(s) 130 are turned on, or are in a "sleep" mode in which the arcade gaming device's display is turned off but some or all of the cabinet arcade gaming device's computing components are still operational. In other embodiments, games may be purchased directly from an electronic menu on the arcade gaming device 130 and, for example, in response, downloaded directly to the arcade gaming device 130.

Game Downloading and Encryption

In particular embodiments, the connected arcade platform is configured with anti-pirating functionality that is adapted to prevent games that are purchased by a particular user to be used on arcade gaming devices 130 of others. For example, the system may be configured so that, in response to a user purchasing a particular game, the system creates a digital package that is customized to only run on one or more particular arcade gaming devices 130 of the user who purchased the particular game. This digital package may include, for example, all of the game files necessary to play the game, and one or more background display pictures associated with the game.

In particular embodiments, the package is then digitally encrypted so that it can only be decrypted and used by the one or more particular arcade gaming devices of the user who purchased the particular game. This may be done, for example, by creating an encryption key that is based, at least in part, on the serial number of at least one cabinet arcade gaming device associated the user who purchased the particular game. The encryption key may be further based on a unique number (e.g., serial number) of the game that was purchased. It should be understood that other encryption methodologies could be used as alternatives.

In various embodiments, the packaging and encryption of the digital package is completed by one or more servers associated with the connected arcade platform and then downloaded to the at least one arcade gaming device 130 associated the user who purchased the particular game. The at least one arcade gaming device 130 may then use the arcade gaming device's 130 unique encryption key to decrypt the package and to install the relevant gaming files and graphics.

Online Play

In particular embodiments, the system is configured to allow users to play arcade games and other electronic games together using a plurality of arcade gaming devices 130 that are connected to communicate with each other (e.g., via a suitable network 115 such as the Internet or a local network, such a local wireless network). The system may do this, for example, by passing control data (e.g., data reflecting joystick movements, button presses, trackball movements, etc.) from one arcade gaming device 130 to a central server 110, which then passes the control data to one or more other arcade gaming devices 130, as depicted in FIG. 2. The system then essentially "spoofs" the one or more arcade gaming devices 130 that receive the data (control-data-receiving arcade gaming devices) into acting as if the control data was received locally by the respective control-data-receiving arcade gaming devices.

In particular embodiments, the server also sends an appropriate signal to each of the arcade gaming devices 130 that are involved in the game indicating when the machine should start game play. This allows all of the users of the participating arcade gaming devices 130 to play the game simultaneously in real time.

In various embodiments, because the system only passes limited data between the various arcade gaming devices 130 and the central server 110 (e.g., less than 5 bytes of data per controller input), and since the bulk of the processing involved is done locally on each machine, the system may operate with little-to-no lag when played using modern networking technology. Another advantage of various embodiments is that the above techniques may allow games that were not originally coded to played via a network (e.g., via a local network or via the Internet) to be played via a network 115 (such games are referred to herein as non-networked games). So, for example, the system may be used to allow two users that are located in different cities to use their respective arcade gaming devices 130 to play a classic, non-networked arcade game (Donkey Kong or Double Dragon) together via a network. In various embodiments, the display 408 shown on the display screen of each of the two users respective arcade gaming devices 130 will be at least essentially the same as if the users were playing the game together on the same arcade gaming device 130.

One advantage of this setup is that it allows users to each play a particular game on their own arcade gaming device 130. For certain games (such as sports games) this may prevent the various players from cheating by observing what other players plan to do (e.g., where the other player plans to pitch, or what play the other player plans to run) in the context of the game. The system may also allow any number of arcade gaming devices 130 to play a single game together. This may, for example, allow a large number of players (e.g., 20 or more players) to participate in a single game (e.g., a baseball game) simultaneously, where each player plays, for example, a different position on a baseball or football team and/or plays the role of a coach or substitute player.

Local Play

As noted above, the system may be configured to allow users to network multiple arcade gaming devices 130 together using a local networking device, such as a wireless router 204, as shown in FIG. 2. This allows multiple users to play the same game on different local arcade gaming devices 130. This may further reduce the use of Internet bandwidth and address any concerns that parents may have regarding their children playing video games online.

Automatic Controller Setup

The digital package provided to an arcade gaming device 130 upon purchase of a game may, in particular embodiments, include a configuration file that includes information needed to automatically configure the arcade gaming device 130 so that, when one or more of its controllers are used to play a particular game, the one or more controllers will cause the system to execute one or more actions that the one or more controllers would have executed in an original version of the arcade game. For example, the configuration file may include information that maps one or more of the arcade gaming device's controllers (e.g., an "X" button) to the corresponding controller of the original game (e.g., an "A" button). The arcade gaming device 130 may be adapted to use this information to automatically remap the system's controllers when the game is loaded to play. This preferably results in game play that is faithful to the game play of the original version (e.g., the original arcade version) of the game.

In some embodiments, where the original game was a game that was controlled by a user pressing or swiping particular areas of a touch screen, the system may be configured to translate input from the arcade gaming device's controllers of the control panel 410 into corresponding touch-screen inputs. For example, if the user uses the joystick to move a cursor to a particular location on the screen and then presses a particular control button (e.g., an "A" button), the system may determine the location of the curser on the screen when the A button is pressed (e.g., the X, Y coordinate on the screen when the "A" button is pressed), the system may pass the particular X, Y coordinate to the game as if the user had used their finger to touch the screen in the particular X, Y coordinate.

In particular embodiments, in operation, the system may receive any system inputs (e.g., joystick movements or button presses), automatically convert those system inputs to those that are true to the original version of the game (as described above), and pass the converted system inputs to an appropriate operating system (e.g., Android) or emulator that runs the game. The operating system or emulator then passes the converted system inputs to the game software, which then controls the action of the game based on the converted system inputs.

Use of Multiple Joysticks as a Single Controller

In various embodiments, the system is adapted to automatically configure multiple joysticks 412 (e.g., a Player 1 joystick and a Player 2 joystick) to coordinate so that they can be used to control the movement of a single player within a particular game. For example, a Player 1 joystick may be used to direct the motion of Player 1 during gameplay, and a Player 2 joystick, which is normally configured to direct the motion of Player 2 during gameplay, is used to aim a weapon associated with Player 1 during gameplay (or to otherwise help control Player 1 during gameplay in some other way than the Player 1 joystick).

Operating System with Embedded Emulators

In various embodiments, each arcade gaming device 130 may be loaded with a computer operating system that includes one or more embedded video game system emulators (e.g., a Super Nintendo or Sega Genesis emulator). In particular embodiments, the system may be adapted to automatically determine which emulator to use to run a particular game (e.g., based on the title of the game, one or more codes associated with the game (e.g., a serial number of the game) and/or information from a suitable data structure that contains data associating each of a plurality of games with its respective emulator) and then to run the particular game on the appropriate emulator (e.g., without input from the user).

Analog Joystick that Senses Degree of Use and Haptic Functionality

In particular embodiments, the arcade gaming device 130 may include one or more analog controllers (e.g., one or more analog joysticks 412) that are configured to sense the degree of movement of the controller in a particular direction (e.g., by using a potentiometer associated with the joystick). The system may then use this information to control the movement of a player icon (or other icon) on the display screen. For example, if a user moves a joystick 412 a relatively short distance to the right, the system may have the player icon walk to the right on the display screen. However, if the user move the joystick 412 a relatively larger distance to the right, the system may have the player icon run to the right on the display screen.

In particular embodiments, the arcade gaming device 130 may include one or more analog controllers (e.g., one or more analog joysticks 130) that include haptic feedback. Mechanical or electro-mechanical haptic feedback mechanisms may, for example, be positioned within the housing 406 and functionally coupled to the joysticks 412 or other controllers of the control panel 410 to provide the applicable haptic feedback.

Configurable Skin

The arcade gaming device 130, in various embodiments, may be adapted to allow users to add different "skins" to (and selectively remove the skins from) the arcade gaming devices' exterior. Such skins may, for example, be removable stickers, decals, wraps, or magnets. The skins may be available for the upper gaming unit 402, the pedestal 404, or both. Fastening mechanisms (e.g., hook and loop fasteners, snaps, zippers) may be positioned on the arcade gaming device 130 and corresponding skins to allow for easy removal and replacement, if not configured as a sticker or having another adhesive.

Example Game Purchase and Download Process

Figure 7:
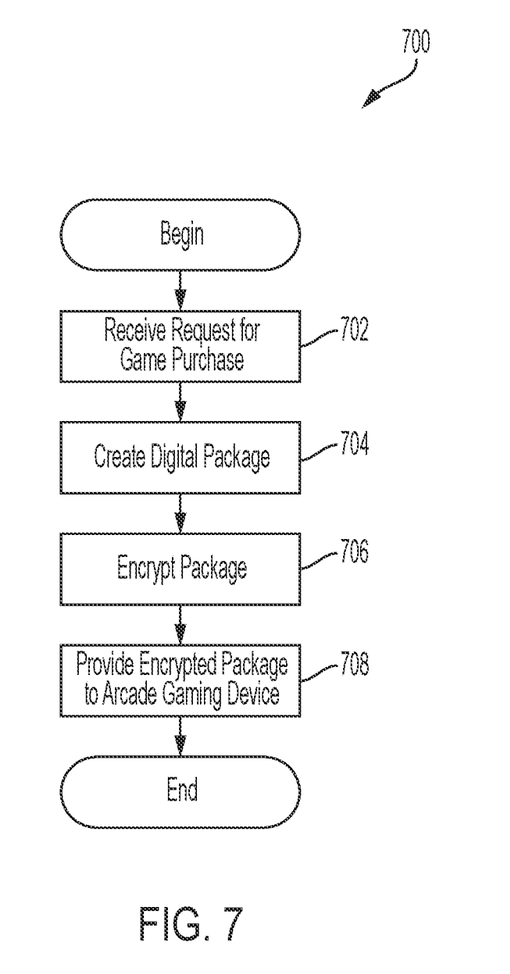
FIG. 7 depicts a process diagram for purchasing a game with the arcade gaming system according to various embodiments.

Turning now to FIG. 7, FIG. 7 shows an illustrative routine 700 for purchasing a game for play on the arcade gaming system 130. It should be understood that the various operations are not all-inclusive and may be performed in an alternative order without departing from the scope of this disclosure. According to one embodiment, the routine 700 begins at operation 702, where a request is received at the central server 110 for the purchase of a particular game. The request may be provided by a mobile device 208 or other computing device via an online software "store", such as Steam, Apple's "app" store, etc. Before submitting the request, the user may browse through a library of available game titles and information. Upon selection and confirmation of a requested game purchase, the gaming application 210 communicates the request to the central server 110 via a network 115.

From operation 702, the routine 700 continues to operation 704, where the central server 110 creates the digital package described above containing one or more corresponding game files necessary to play the game, and one or more background display pictures associated with the game.

At operation 706, the digital package is encrypted so that it can only be decrypted and used by the one or more particular arcade gaming devices 130 of the user who purchased the particular game. This may be done, for example, by creating an encryption key that is based, at least in part, on the serial number of at least one arcade gaming device 130 associated the user who purchased the particular game. The encryption key may be further based, at least in part, on a unique number (e.g., serial number) of the game that was purchased. After encryption, the routine 700 continues to operation 708, where the encrypted digital package is provided to the one or more arcade gaming devices 130 associated with the user that purchased the game.

Figure 8:
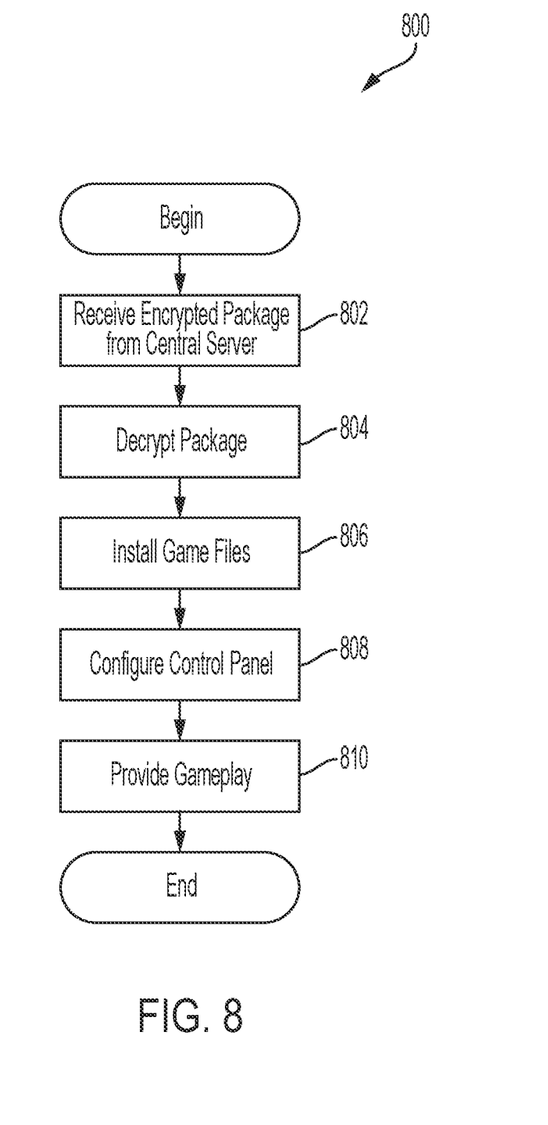
FIG. 8 depicts a process diagram for downloading a game with the arcade gaming system according to various embodiments.

FIG. 8 shows an illustrative routine 800 for receiving a purchased game with the arcade gaming system 130. The routine 800 begins at operation 802, where the encrypted package containing the one or more game files is received from the central server 110 at the one or more arcade gaming systems 130 associated with the purchasing user. At operation 804, the package is decrypted by the one or more gaming systems 130. After decryption, the routine 800 continues to operation 806, where the applicable decrypted game files are saved to memory on the arcade gaming system 130. At operation 808, the control panel 410 is configured according to the purchased game, mapping the controls to the corresponding game controls, and the background image associated with the game is saved as the arcade gaming system's current background image. The purchased game is then ready for play at operation 810.

CONCLUSION

Many modifications and other embodiments of the invention will come to mind to one skilled in the art to which this invention pertains, having the benefit of the teaching presented in the foregoing descriptions and the associated drawings. Therefore, it is to be understood that the invention is not to be limited to the specific embodiments disclosed and that modifications and other embodiments are intended to be included within the scope of the appended claims. It should also be specifically understood that any steps executed within a set of computer-executable instructions would be executed by at least one computer processor associated with memory.

Also, although various embodiments are described above as using arcade gaming devices to facilitate play of video games, other embodiments may use different types of home or professional arcade systems in place of the arcade gaming devices. Also, although various embodiments are described as running classic arcade games, the system may be configured to run different types of games such as modern or classic video game console games, casino games, games that are designed for play on a mobile device such as a smartphone or tablet, or any other suitable games. Although specific terms are employed herein, they are used in a generic and descriptive sense only and not for the purposes of limitation.

What is claimed is:

1. A gaming system, comprising:
   a first arcade gaming device comprising an upper gaming unit, the upper gaming unit comprising:
   a housing defining a front opening;
   one or more computer processors disposed within the housing;
   memory disposed within the housing and communicatively coupled to the one or more computer processors;

a computer program product stored within the memory and having computer-readable instructions corresponding to an arcade game;
a display positioned adjacent to the front opening; and
a control panel comprising at least one game controller,
wherein the one or more computer processors, the computer program product, the display, and the control panel are operatively coupled to allow a user to play the arcade game, and the first arcade gaming device is adapted to:
generate control data reflecting one or more interactions by the user with the at least one game controller while playing the arcade game, and
transmit the control data to a central server communicatively coupled to the first arcade gaming device, wherein the central server is adapted to allow the user and a second user to play the arcade game together on the first arcade gaming device and a second arcade gaming device communicatively coupled to the central server by passing the control data from the first arcade gaming device to the second arcade gaming device so that the control data is executed on the second arcade gaming device as though the one or more interactions have been locally received by the second arcade gaming device; and
a gaming application configured for execution on a mobile computing device, wherein:
the central server is adapted to:
receive a purchase request corresponding to the arcade game from the gaming application,
in response to receiving the purchase request, create a digital package comprising the computer program product,
encrypt the digital package to generate an encrypted digital package comprising the computer program product and an encryption key, and
provide the encrypted digital package to the first arcade gaming device.

2. The gaming system of claim 1, further comprising:
a pedestal, comprising:
a front pedestal panel,
a rear pedestal panel, and
two side pedestal panels; and
a fastening mechanism configured to secure the upper gaming unit to the pedestal.

3. The gaming system of claim 2, wherein at least one of the front pedestal panel, the rear pedestal panel, and the two side pedestal panels comprises a preassembled cabinet-electronics assembly configured to provide access to the arcade game or control at least a portion of the arcade game.

4. The gaming system of claim 3, wherein the pedestal comprises a foot pedal operatively coupled to the control panel.

5. The gaming system of claim 1, wherein the front opening is configured at a non-zero angle of the front opening relative to horizontal comprising an angle of between about 57 degrees and about 63 degrees.

6. The gaming system of claim 5, wherein the upper gaming unit further comprises a speaker panel having at least one speaker preinstalled on a support portion configured to be operably connected to the upper gaming unit.

7. The gaming system of claim 1, wherein the first arcade gaming device is communicatively coupled to the central server via a first router, and wherein the second arcade gaming device is communicatively coupled to the central server via a second router that is different than the first router.

8. The gaming system of claim 1, wherein the first arcade gaming device and the second arcade gaming device are both communicatively coupled to the central server via a first router.

9. The gaming system of claim 1, wherein the upper gaming unit is sized and configured for positioning on a tabletop for operation without a pedestal.

10. The gaming system of claim 1, wherein the first arcade gaming device is further adapted to automatically configure the control panel to map the at least one game controller to one or more controls of the arcade game.

11. The gaming system of claim 10, wherein the at least one game controller comprises two joysticks configured to cooperate to control movement of a single player within the arcade game.

12. The gaming system of claim 1, wherein the first arcade gaming device is adapted to:
receive the encrypted digital package from the central server;
decrypt the encrypted digital package;
install the computer program product; and
provide gameplay of the arcade game to the user.

13. The gaming system of claim 1, wherein the encryption key is based at least in part on a serial number of the first arcade gaming device.

14. A gaming system, comprising:
a first arcade gaming device comprising a gaming unit, the gaming unit comprising:
a housing defining a front opening;
one or more computer processors disposed within the housing;
memory disposed within the housing and communicatively coupled to the one or more computer processors;
a computer program product stored within the memory and having computer-readable instructions corresponding to an arcade game;
a display positioned adjacent to the front opening; and
a control panel comprising at least one game controller,
wherein the one or more computer processors, the computer program product, the display, and the control panel are operatively coupled to allow a user to play the arcade game, and the first arcade gaming device is adapted to:
generate control data reflecting one or more interactions by the user with the at least one game controller while playing the arcade game, and
transmit the control data to a central server communicatively coupled to the first arcade gaming device, wherein the central server is adapted to allow the user and a second user to play the arcade game together on the first arcade gaming device and a second arcade gaming device communicatively coupled to the central server by passing the control data from the first arcade gaming device to the second arcade gaming device so that the control data is executed on the second arcade gaming device as though the one more interactions have been locally received by the second arcade gaming device, and
wherein the memory of the first arcade gaming device comprises second computer-readable instructions corresponding to one or more embedded video game system emulators, and the first arcade gaming device is adapted to automatically determine which embedded video game system emulator to use to run the arcade game and to run the arcade game on the determined video game system emulator.

15. The gaming system of claim 1, wherein the housing is configurable with at least one preassembled cabinet-electronics assembly comprising an electronics component installed within a support structure of the housing.

16. The gaming system of claim 1, wherein the at least one game controller comprises a haptic feedback mechanism configured to provide haptic feedback through the at least one game controller in response to an event in the arcade game.

17. The gaming system of claim 1, wherein the housing comprises a replaceable skin configured to alter a look of the first arcade gaming device.

18. The game system of claim 14, further comprising:
a gaming application configured for execution on a mobile computing device, wherein:
the central server is adapted to:
receive a purchase request corresponding to the arcade game from the gaming application,
in response to receiving the purchase request, create a digital package comprising the computer program product,
encrypt the digital package to generate an encrypted digital package comprising the computer program product and an encryption key, and
provide the encrypted digital package to the first arcade gaming device.

19. A gaming system, comprising:
a gaming unit, the gaming unit comprising:
a housing defining a front opening;
a display positioned adjacent to the front opening;
a control panel comprising at least one game controller; and
a first gaming computer comprising one or more computer processors, one or more embedded video game system emulators, and memory communicatively coupled to the one or more computer processors, the first gaming computer adapted to:
automatically determine which embedded video game system emulator to use to run a game;
generate control data reflecting one or more interactions by a user with the at least one game controller while playing the game; and
transmit the control data to a central server communicatively coupled to the first gaming computer, wherein the central server is adapted to allow the user and a second user to play the game together on the first gaming computer and a second gaming computer communicatively coupled to the central server by passing the control data from the first gaming computer to the second gaming computer so that the control data is executed on the second gaming computer as though the one or more interactions have been locally received by the second gaming computer.

20. The gaming system of claim 19, wherein the first gaming computer is further adapted to:
provide a menu of available games on the display for purchase from an on-line game store;
receive a selection of the game for download from the on-line game store; and
request the game from the central server.

21. The gaming system of claim 19, wherein:
the at least one game controller comprises at least one joystick and a plurality of gaming control buttons; and
the first gaming computer is further adapted to automatically configure the control panel to map the at least one joystick and at least one of the plurality of gaming control buttons to one or more controls of the game.

22. The gaming system of claim 19, wherein the first gaming computer is adapted to:
receive an encrypted digital package comprising at least one game file corresponding to the game and an encryption key based at least in part on an identifier of the gaming unit,
decrypt the encrypted digital package,
install the at least one game file,
configure the control panel according to the at least one game file, and
provide gameplay of the game.

23. The gaming system of claim 22, wherein the identifier comprises a serial number of the gaming unit.

24. A gaming system, comprising:
a central server; and
a first arcade gaming device, the first arcade gaming device adapted for wireless communication with the central server via a network, the first arcade gaming device comprising:
a gaming unit, the gaming unit comprising:
a housing defining a front opening;
a display positioned adjacent to the front opening;
a control panel comprising at least one game controller; and
a gaming computer comprising one or more computer processors and memory communicatively coupled to the one or more computer processors,
wherein the central server is adapted to:
receive control data via the network from the first arcade gaming device, the control data reflecting one or more interactions by a user with the at least one game controller while playing a game on the first arcade gaming device, and
transmitting the control data via the network to a second arcade gaming device communicatively coupled to the central server to allow the user and a second user to play the game together on the first arcade gaming device and the second arcade gaming device so that the control data is executed on the second arcade gaming device as though the one or more interactions have been locally received by the second arcade gaming device; and
a gaming application configured for execution on a mobile computing device, wherein:
the central server is adapted to:
receive a purchase request corresponding to the game from the gaming application,
in response to receiving the purchase request, create a digital package comprising a computer program product,
encrypt the digital package to generate an encrypted digital package comprising the computer program product and an encryption key, and
provide the encrypted digital package to the first arcade gaming device.

25. The gaming system of claim 24, wherein the first arcade gaming device is adapted to:
- receive the encrypted digital package from the central server;
- decrypt the encrypted digital package;
- install the computer program product; and
- provide gameplay of the game to the user.

* * * * *